(12) United States Patent
Haiby-Weiss et al.

(10) Patent No.: US 10,176,263 B2
(45) Date of Patent: Jan. 8, 2019

(54) IDENTIFYING PATHS USING SOCIAL NETWORKING DATA AND APPLICATION DATA

(71) Applicant: Microsoft Technology Licensing, LLC, Redmond, WA (US)

(72) Inventors: Neta Haiby-Weiss, Los Altos, CA (US); Amir Pinchas, Gedera (IL); Hanan Lavy, Redmond, WA (US); Yitzhak Tzahi Weisfeld, Hold Hasharon (IL); Yair Snir, Tel Aviv (IL); Royi Ronen, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 545 days.

(21) Appl. No.: 14/865,087

(22) Filed: Sep. 25, 2015

(65) Prior Publication Data
US 2017/0091332 A1 Mar. 30, 2017

(51) Int. Cl.
*G06F 17/30* (2006.01)
*G06Q 50/00* (2012.01)

(52) U.S. Cl.
CPC .. *G06F 17/30867* (2013.01); *G06F 17/30958* (2013.01); *G06Q 50/00* (2013.01); *G06Q 50/01* (2013.01)

(58) Field of Classification Search
CPC .............. G06F 17/30864; G06F 21/36; G06F 17/30958; G06Q 50/00; G06Q 50/01
See application file for complete search history.

(56) References Cited

U.S. PATENT DOCUMENTS

| 7,188,153 B2 | 3/2007 | Lunt et al. |
| 8,195,656 B2 | 6/2012 | Grasset |
| 8,554,794 B2 | 10/2013 | Brydon et al. |

(Continued)

OTHER PUBLICATIONS

Bozzon, et al., "Choosing the Right Crowd: Expert Finding in Social Networks", In Proceedings of 16th International Conference on Extending Database Technology, Mar. 18, 2013, 12 pages.

(Continued)

*Primary Examiner* — Merilyn P Nguyen
(74) *Attorney, Agent, or Firm* — Goff IP Law PLLC; Jared S. Goff

(57) ABSTRACT

Data from social networking applications and other applications that can be used to communicate are combined for a user to generate a graph of the various relationships that the user has with other users in the social networking applications and other applications. In addition, the behaviors of each user with respect to communicating through the various social networking applications and other applications are monitored to generate task data that describes user preferences for communicating using each social networking application or other application for different tasks. At a later time, when a user is looking to connect with another user for an indicated task such as networking, the graph can be used to recommend paths to other users in the various social networking applications and other applications, and the generated task data can be used to rank the recommended paths based on the indicated task.

20 Claims, 5 Drawing Sheets

(56) References Cited

U.S. PATENT DOCUMENTS

| | | | |
|---|---|---|---|
| 8,943,053 B2* | 1/2015 | Kristiansson | G06Q 10/10 |
| | | | 707/732 |
| 9,355,157 B2* | 5/2016 | Mohammed | G06F 17/30554 |
| 9,756,006 B2* | 9/2017 | Shapero | H04L 51/26 |
| 2010/0306834 A1 | 12/2010 | Grandison et al. | |
| 2011/0125770 A1* | 5/2011 | Battestini | G06Q 10/00 |
| | | | 707/758 |
| 2011/0191352 A1 | 8/2011 | Jones et al. | |
| 2012/0096002 A1* | 4/2012 | Sheehan | G06Q 10/10 |
| | | | 707/737 |
| 2012/0246720 A1* | 9/2012 | Xie | H04L 63/145 |
| | | | 726/22 |
| 2013/0007126 A1* | 1/2013 | Ziemann | G06Q 50/01 |
| | | | 709/204 |
| 2013/0254192 A1 | 9/2013 | Work et al. | |
| 2013/0254213 A1 | 9/2013 | Cheng et al. | |
| 2013/0325847 A1* | 12/2013 | Suchter | G06F 17/30864 |
| | | | 707/722 |
| 2014/0095430 A1 | 4/2014 | Ranjan et al. | |
| 2014/0214941 A1* | 7/2014 | Shapero | H04L 51/32 |
| | | | 709/204 |
| 2014/0244335 A1* | 8/2014 | Baldwin | G06Q 10/063118 |
| | | | 705/7.17 |
| 2015/0026120 A1* | 1/2015 | Chrapko | G06Q 50/01 |
| | | | 707/609 |
| 2015/0186427 A1* | 7/2015 | Logothetis | G06F 17/30958 |
| | | | 707/776 |
| 2017/0061005 A1* | 3/2017 | Purcell | G06F 17/30864 |
| 2017/0199920 A1* | 7/2017 | Pearson | G06F 17/30569 |

OTHER PUBLICATIONS

Guo, et al. "A Hybrid Social Search Model Based on the User's Online Social Network", In Proceedings of IEEE 2nd International Conference on Cloud Computing and Intelligent Systems, vol. 2, Oct. 30, 2012, pp. 553-558.

Sharif, et al., "A Review on Search and Discovery Mechanisms in Social Networks", In International Journal of Information Engineering and Electronic Business, vol. 5, Issue 6, Dec. 2013, pp. 64-72.

Guo, et al. "SFViz: Interest-based Friends Exploration and Recommendation in Social Networks", In Proceedings of International Symposium on Visual Information Communication, Aug. 4, 2011, 10 pages.

Perer, et al., "Unearthing People from the SaND: Relationship Discovery with Social Media in the Enterprise", In Proceedings of Fifth International AAAI Conference on Weblogs and Social Media, Jul. 17, 2011, pp. 582-585.

Wang, et al., "Social Context-Aware Trust Inference for Trust Enhancement in Social Network based Recommendations on Service Providers", In Journal of World Wide Web, vol. 18, Issue 1, Jan. 2015, 4 pages.

* cited by examiner

IDENTIFYING PATHS USING SOCIAL NETWORKING DATA AND APPLICATION DATA

BACKGROUND

Users typically have accounts in a variety of social networking applications. A typical user may use each social networking application account for different tasks. For example, a user may use one social networking application for professional purposes like networking, and another social networking application for interacting with their friends and family. Users may also have accounts in social networking applications that they rarely use.

Each of these social networking accounts typically includes a different communication type that may be used to contact other users in the social network. For example, each social networking application may have its own associated messaging application that may be used by the users to interact. In addition, users may also use other productivity applications that can be used to communicate with other users such as email applications, instant messaging applications, and VoIP applications.

SUMMARY

Data from social networking applications and other applications that can be used to communicate, are combined for a user to generate a graph of the various relationships that the user has with other users in the social networking applications and other applications. In addition, the behaviors of each user with respect to communicating through the various social networking applications and other applications are monitored to generate task data that describes user preferences for communicating using each social networking application or other application for different tasks. At a later time, when a user is looking to connect with another user for an indicated task such as networking, the graph can be used to recommend paths to other users in the various social networking applications and other applications, and the generated task data can be used to rank the recommended paths based on the indicated task.

In an implementation, a system comprises at least one computing device adapted to generate a query for a user, and a graph engine. The graph engine is adapted to receive first social networking data from a first social network, wherein the first social networking data comprises a first plurality of contacts associated with the user and a first communication type of a plurality of communication types, receive second social networking data from a second social network, wherein the second social networking data comprises a second plurality of contacts associated with the user and a second communication type of the plurality of communication types, and receive application data from a productivity application, wherein the application data comprises a third plurality of contacts associated with the user and a third communication type of the plurality of communication types. The graph engine is further adapted to generate a graph from the first social networking data, the second social networking data, and the application data, wherein the graph comprises a plurality of nodes and each node represents one of a contact of the first plurality of contacts, a contact from the second plurality of contacts, a contact from the third plurality of contacts, and the user, and wherein the graph further comprises a plurality of edges, each edge connects two nodes of the plurality of nodes, and each edge represents one of the first communication type, the second communication type, or the third communication type. The graph engine is further adapted to receive the query from the user, identify at least one node of the graph that is responsive to the query, identify one or more paths in the graph that connect the identified at least one node and the node representing the user, wherein each identified one or more paths comprises a sequence of nodes and edges from the graph, and provide the identified one or more paths to the at least one computing device in response to the query.

In an implementation, first social networking data is received from a first social network by a computing device, wherein the first social networking data comprises a first plurality of contacts associated with a user and a first communication type of a plurality of communication types. Second social networking data is received from a second social network by the computing device, wherein the second social networking data comprises a second plurality of contacts associated with the user and a second communication type of the plurality of communication types. A graph is generated from the first social networking data and the second social networking data by the computing device. The graph comprises a plurality of nodes and each node represents one of a contact of the first plurality of contacts, a contact from the second plurality of contacts, or the user. The graph further comprises a plurality of edges, each edge connects two nodes of the plurality of nodes, and each edge represents either the first communication type or the second communication type. A query is received from the user by the computing device. At least one node of the graph that is responsive to the query is identified by the computing device. One or more paths in the graph that connect the identified at least one node and the node representing the user are identified by the computing device, wherein each identified one or more path comprises a sequence of nodes and edges from the graph. The identified one or more paths are provided in response to the query by the computing device.

In an implementation, a graph of a first social network and a second social network for a user are received by a computing device. The first social network is associated with a first communication type of a plurality of communication types and the second social network is associated with a second communication type of the plurality of communication types. The graph comprises a plurality of nodes and each node represents one of a contact of a first plurality of contacts of the first social network, a contact of a second plurality of contacts of the second social network, or the user, and wherein the graph further comprises a plurality of edges, each edge connects two nodes of the plurality of nodes, and each edge represents either the first communication type or the second communication type. Activity of the user is monitored on the computing device to generate task data, wherein the task data identifies a plurality of tasks, each identified task is associated with a contact from either the first or the second plurality of contacts, each identified task is associated with an indication of whether or not the task was successful, and each identified task is associated with either the first or the second communication types. A query is received from the user by the computing device, wherein the query identifies a task. At least one node of the graph that is responsive to the query is identified by the computing device. One or more paths in the graph that connect the identified at least one node and the node representing the user are identified by the computing device. Each of the identified one or more paths comprises a sequence of nodes and edges from the graph. Each of the identified one or more paths are ranked based on the contacts represented by the nodes in each path, the contacts associated with the tasks of the plurality of tasks, the first type of communication or second type of communication associated with the edges in each path, and the indication associated with each task of the plurality of tasks. The identified one or more paths are provided according to the ranking in response to the query by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
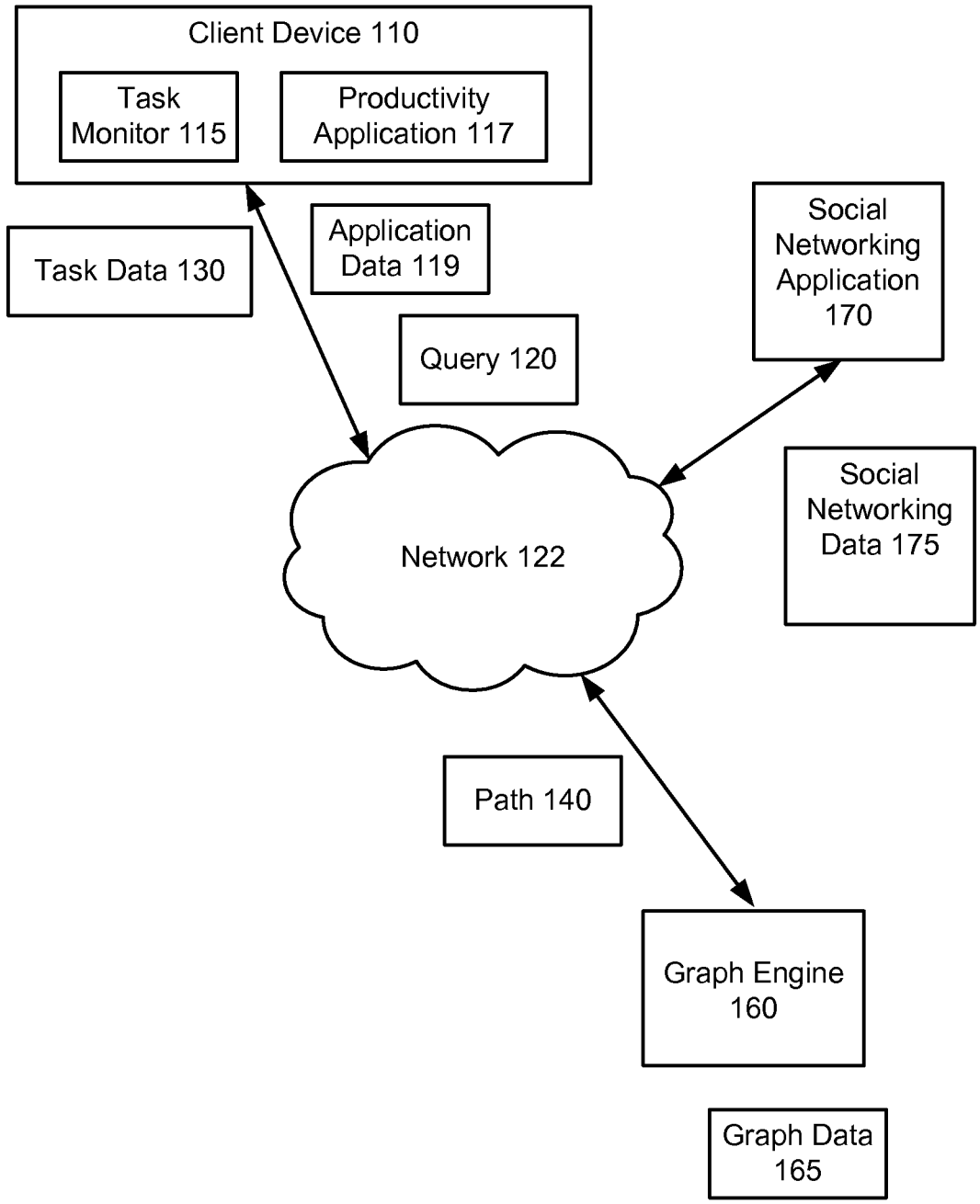
FIG. 1 is an illustration of an exemplary environment for identifying paths in a graph in response to queries.

FIG. 1 is an illustration of an exemplary environment 100 for identifying paths in a graph in response to queries. The environment 100 may include a graph engine 160, a social networking application 170, and a client device 110 in communication through a network 122. The network 122 may be a variety of network types including the public switched telephone network (PSTN), a cellular telephone network, and a packet switched network (e.g., the Internet). Although only one client device 110, social networking application 170, and graph engine 160 are shown in FIG. 1, there is no limit to the number of client devices 110, graph engines 160, and social networking applications 170 that may be supported.

Figure 5:
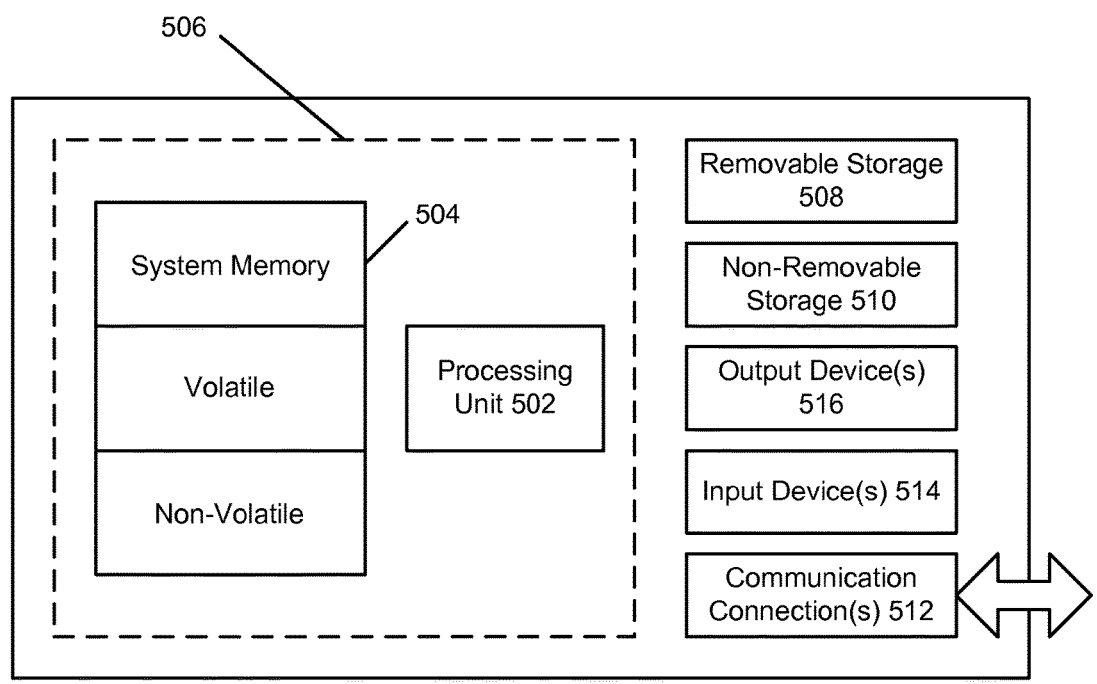
FIG. 5 shows an exemplary computing environment in which example embodiments and aspects may be implemented.

The client device 110, social networking application 170, and graph engine 160 may be implemented using a variety of computing devices such as smart phones, desktop computers, laptop computers, tablets, and video game consoles. Other types of computing devices may be supported. A suitable computing device is illustrated in FIG. 5 as the computing device 500.

A user associated with the client device 110 may have an account in a social networking application 170. The account may include a profile associated with the user and may include information such as an employer of the user, likes and dislikes of the user, skills associated with the user, organizations or businesses associated with the user, an age of the user, and a current location or residence of the user.

A user of a social networking application 170 may establish one or more social networking relationships with other users of the social networking application 170. An example a social networking relationship is the "friends" relationship. Other types of social networking relationships may be supported such as "following" or "follower." For purposes of clarity, the users that a user of a particular social networking application 170 has a social networking relationship with are referred to herein as contacts.

Each social networking application 170 may be associated with a particular communication type used to communicate within the social networking application 170. For example, each social networking application 170 may allow users to communicate privately by sending private direct messages to each other, and may allow users to communicate publically by posting public messages to a web page, "wall", or other location where some or all of the users of the social networking application 170 may view them.

Users may also communicate using one or more productivity applications 117. Examples of productivity applications 117 include e-mail applications, VoIP applications, and instant messaging applications. In addition, some video game applications may allow users to communicate or exchange messages. The methods through which the productivity applications 117 allow users to communicate may each be considered a different type of communication. Similar to social networking applications 170, each user may have an account (e.g., e-mail address, phone number, or user name) associated with each productivity application 117. The users that a particular user communicates with using a productivity application 117 are also referred to herein as contacts.

Given the large number of social networking applications 170 and productivity applications 117 that users may have access to, a user may have difficulty determining the best way to contact another user with regards to a particular task. For example, a host may wish to invite a particular user to a party, and may have a social networking relationship with the particular user in several social networking applications 170. The host may also have the email address and phone number of the particular user. Because of the various communication types available, the host may have trouble deciding which one to use. The choice of communication types may be important because the particular user may rarely use some of their social networking applications 170 or productivity applications 117, while regularly using others. In addition, the host may not even be aware of all of the various social networking applications 170 and productivity applications 117 that the particular user may be contacted through.

In another example, a student user may be trying to determine whether to attend a particular university. The student may have various contacts in one or more of the productivity applications 117 and social networking applications 170 that attend the university or that work at the university. However, to determine the relevant contacts the user may have to search each of the social networking applications 170 and/or productivity applications 117 individually for contacts that are associated with the university. Even then, any contacts that are determined may not necessarily be the best contacts (e.g., the contacts that are most likely to respond to the student or that are have the closest social distance to the student across all of the productivity applications 117 and social networking applications 170), and the student may still not know the best communication type to use for each contact.

In another example, an applicant may be interested in reaching out to another user to apply for a job, and the applicant may have difficulty selecting which social networking application 170 or productivity application 117 to use to contact the user. The applicant may select the social networking application 170 with a focus on business or networking to contact the user, but unbeknownst to the applicant, the user may not regularly use the social networking application 170 despite having an account.

Accordingly, the environment 100 may include the graph engine 160. The graph engine 160 may consolidate information from the social networking applications 170 and productivity applications 117 associated with each user into one or more graphs. Each graph may include a node for each contact across some or all of the productivity applications 117 and social networking applications 170, and edges that connect nodes that represent the social networking relationships, or other relationships, between contacts. The graph generated for a particular user, or all users, may then be used to respond to contact related queries 120 in a way that considers all of the various productivity applications 117 and social networking applications 170 that are available or that are relevant.

In some implementations, the graph engine 160 may generate a graph by receiving social networking data 175 and application data 119 associated with a user. The social networking data 175 for a particular social networking application 170 may include the profile associated with the user and indicators of the contacts associated with the user in the social networking application 170. Depending on the implementation, each user may provide login information or credentials that may be used by the graph engine 160 to request and retrieve the social networking data 175 and application data 119 associated with the user. Other methods may be used. The generated graph may be stored by the graph engine 160 as the graph data 165.

The graph data 165 may be used by the graph engine 160 to generate a path 140 in response to a query 120 received from a user. A path 140 may be a sequence of nodes in the graph that connects a node representing the user to a contact that was determined to be responsive to one or more terms of the query 120. Continuing the example above, the path 140 may include a path to a user who has profile information that matches the university identified in the query 120. Each node on the path 140 may represent a contact in one or more of the productivity applications 117 or social networking applications 170 associated with a user. The user may then communicate directly with the determined contact, or may determine to get a contact identified by a node in the path 140 to introduce them to the determined contact.

In order to facilitate the recommendation of communication types, the graph engine 160 may further collect task data 130 regarding each user. Depending on the implementation, the task data 130 may include identifiers of various tasks performed by the users using the productivity applications 117 and/or social networking applications 170. The tasks may include responding to emails using a productivity application 117, sending messages to other contacts in one of the social networking applications 170, and checking voicemail associated with a productivity application 117. As will be described further with respect to FIG. 2, the task data 130 may be any data that can help the graph engine 160 determine how each user uses the various productivity applications 117 and social networking applications 170. The task data 130 may be used by the graph engine 160 to recommend to a user the best communication type to use for each contact, for example.

In some implementations, the task data 130 may be collected by a task monitor 115 installed by users on one or more of the client devices 110. The task monitor 115 may monitor the various tasks performed by the user of the client device 110, and may periodically generate and send task data 130 to the graph engine 160. Alternatively or additionally, the task monitor 115 may be integrated into the productivity applications 117 or social networking applications 170. Users may be asked to opt-in or otherwise consent to the collecting and transmission of the task data 130 by the task monitor 115. In addition, any information that may be used to uniquely identify a user may be removed from the task data 130 before it is transmitted to the graph engine 160.

Figure 2:
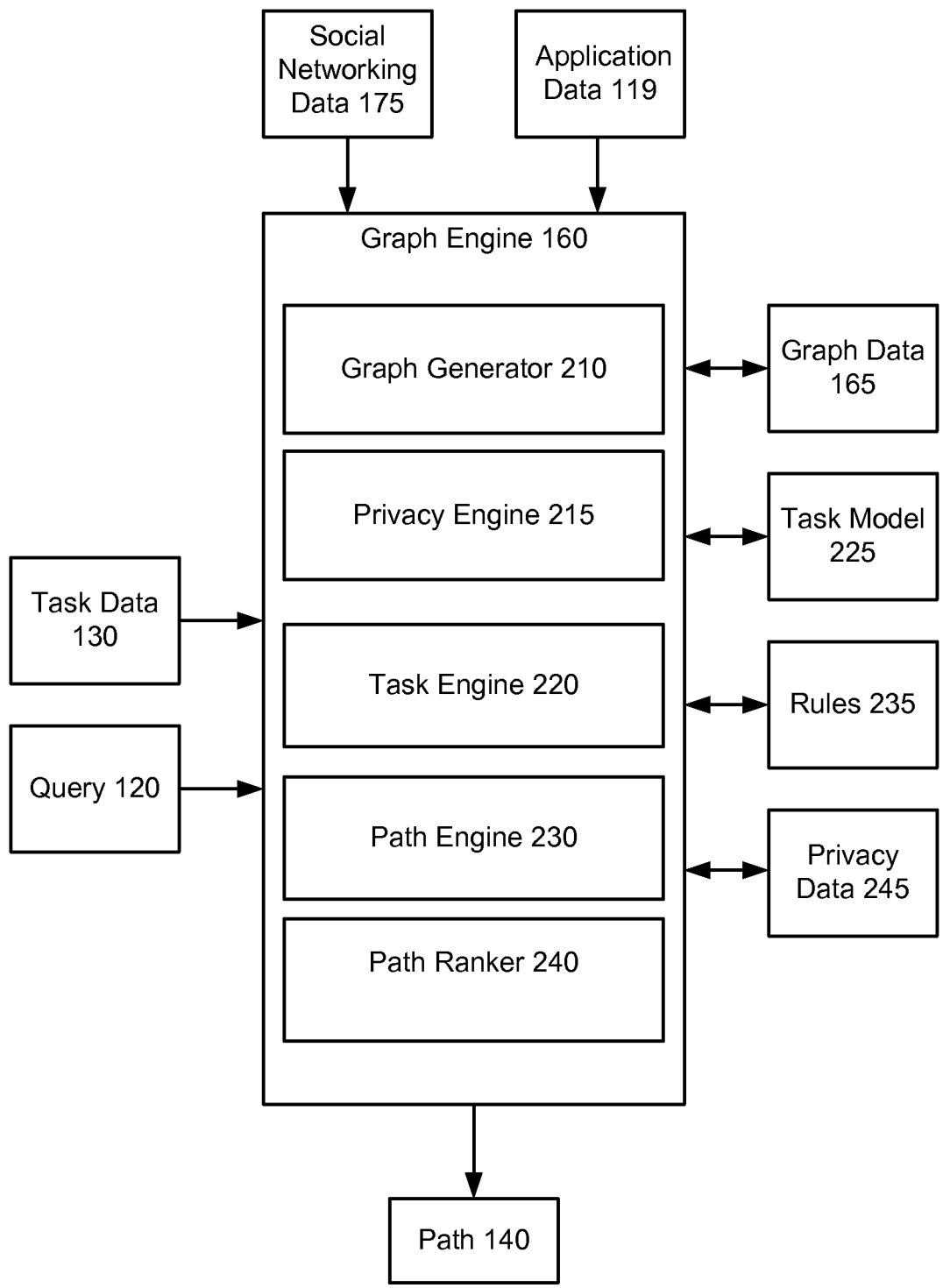
FIG. 2 is an illustration of an implementation of an exemplary graph engine.

FIG. 2 is an illustration of an implementation of an exemplary graph engine 160. The graph engine 160 may include one or more components including a graph generator 210, a privacy engine 215, a task engine 220, a path engine 230, and a path ranker 240. More or fewer components may be included in the graph engine 160. Some or all of the components of the graph engine 160 may be implemented by one or more computing devices such as the computing device 500 described with respect to FIG. 5.

The graph generator 210 may generate a graph from received productivity application data 119 and social networking data 175. The graph generator 210 may generate a graph for a single user, or may generate a larger graph by combining application data 119 and social networking data 175 from a plurality of users. The generated graph may be stored by the graph generator 210 as the graph data 165.

Depending on the implementation, a user may establish an account with the graph engine 160. The user may select an account name and may indicate the various social networking applications 170 and productivity applications 117 that the user has an associated account with. In addition, the user may provide any credentials that are associated with the account such as passwords, etc. The graph generator 210 may then use the credentials to retrieve the application data 119 and social networking data 175 associated with the various accounts. Alternatively or additionally, the user may instruct the various productivity applications 117 and social networking applications 170 to provide the application data 119 and social networking data 175 directly to the graph generator 210.

The graph generator 210 may use the application data 119 and the social networking data 175 to generate a graph for a user. In some implementations, the graph generator 210 may generate the graph by creating a node for each contact identified in the application data 119 and social networking data 175, as well as a node that represents the particular user. The node for a contact or the user may include any associated profile information from any of the associated productivity applications 117 and/or social networking applications 170 such as name, education, interests, address, employment, etc. As may be appreciated, a single contact may appear in the application data 119 and social networking data 175 for numerous productivity applications 117 and social networking applications 170. For example, a user "Bob Smith" may be a friend of the user and may appear as a contact for the user in a productivity application 117 such as an email application, and as a contact in several of the social networking applications 170.

In order to avoid duplicate nodes in the generated graph, the graph generator 210 may include a single node in the graph for each unique contact from all of the social networking applications 170 and/or productivity applications 117. Depending on the implementation, each node for a contact, in addition to the profile information, may also include indicators of the particular social networking applications 170 and/or productivity applications 117 that the contact is part of.

In some implementations, the graph generator 210 may identify duplicate contacts based on the name or other profile information associated with each contact in the productivity applications 117 and/or social networking applications 170. For example, the contact "Bob Jones" may use the name "Bob Jones" on a casual social networking application 170, and "Robert J. Jones" in a business or networking focused social networking application 170. In addition, in a productivity application 117 such as a telephone application, the user may list the contact as "B. Jones." In order to determine that all of the various contacts are the same "Bob Jones", the graph generator 210 may match contacts based on common nicknames, aliases, or known alternative spellings or even misspellings. The graph generator 210 may also look for similar profile information such as phone numbers, universities, interests, etc. Other methods for determining duplicate contacts may be used.

The graph generator 210 may add edges between the nodes for the various contacts and the node for the user in the generated graph. An edge between two nodes may indicate that the contacts and/or users associated with the nodes are connected through the same social networking application 170 or productivity application 117. Depending on the implementation, node pairs may have multiple edges between them, with each edge corresponding to a different productivity application 117 or social networking application 170.

As described above, each social networking application 170 or productivity application 117 may be associated with one or more communication types. The communication types may include e-mail, instant message, SMS, telephone, etc. Other types of communication types used by a social networking application 170 or productivity application 117 may be supported. In such cases the edges between nodes may also represent the communication types that may be used for the contacts or users associated with the nodes to communicate through one or more of the associated social networking applications 170 and/or productivity applications 117.

Depending on the implementation, the graph generator 210 may generate a graph for each user, and the graph generated for each user may be used to respond to queries 120 received from the same user. Alternatively, some or all of the generated graphs 160 may be combined by the graph generator 210 to generate a larger combined graph by merging nodes from each graph that represent the same contact. The larger combined graph may be used to respond to queries 120 for any user whose graph is part of the combined graph, leading to a more detailed search experience for the users.

The graph engine 160 may further include a privacy engine 215. The privacy engine 215 may allow users to control how their profiles or other information associated with the generated graph can be viewed or "discovered" by other users. Users typically manage privacy settings with respect to social networking applications 170. These privacy settings may allow users to designate what aspects of their profile, images, videos, and messages are viewable by other users. For example, a social networking application 170 may allow a user to group their contacts into categories such as work and family. The users may then set what aspects of their profile and other content is viewable by contacts based on the groups.

In addition, users often use different privacy settings based on the particular social networking application 170 that they are using. For example, a user may only post work related information on a social networking application 170 that focuses on business contacts, and may post personal information on a social networking application 170 that focuses on images or videos. Because of the different ways that a user makes use of the different social networks, the privacy settings associated with each social networking application 170 for the user may be very different.

Because the graph generator 210 uses application data 119 and social networking data 175 collected from a variety of productivity applications 117 and social networking applications 170 to construct the graphs, the privacy engine 215 may allow users to set privacy settings with respect to how their node or profile may be discovered by other users when searching the graphs. In some implementations, the privacy engine 215 may use imported privacy settings from the various social networking applications 170. Alternatively or additionally, users may set or modify privacy settings using a web page or other user-interface associated with the graph engine 160. The privacy settings for each user may be stored by the privacy engine 215 as the privacy data 245.

The privacy engine 215 may allow users to control how other users may discover them in the generated graph through the privacy settings. Depending on the implementation, the privacy settings may allow a user to restrict discovery with respect to individual contacts, groups of contacts, or to specific social networking applications 170 of productivity applications 117. For example, a user may specify that they may be discovered by contacts originating from a social networking application 170 focusing on business networking and not by contacts originating from a social networking application 170 focusing on videos. Any other type of privacy settings may be supported.

The task engine 220 may collect task data 130 regarding the users represented by the generated graph. In some implementations, a task may be an action performed by a user with respect to one or more of their contacts using a communication type associated with one or more of the social networking applications 170 or productivity applications 117. For example, tasks performed by a user may include sending an email to a contact using a productivity application 117, calling a contact using a productivity application 117, or sending a message to a contact using a social networking application 170. Other types of tasks may be supported.

The task data 130 for a task and a user may identify the contact that the task was directed to, the type of communication associated with the task, the productivity application 117 or social networking application 170 associated with the task, and an indication of whether or not the task was completed successfully. Whether or not a task is completed successfully may depend on the type of task. For example, in some situations where the task is sending an email to a contact, the task may be considered successfully completed if the email is received and read by the contact. In other situations, the task may be considered successfully completed when a follow-up email is received. In still other situations, the task may be considered successfully completed when the contact provides information or performs an act that is requested in the email (e.g., answers a question, agrees to meet for coffee, or accepts a resume).

As described above, in some implementations, the task data 130 is collected for each user by a task monitor 115 installed on the client device(s) 110 associated with the user. The task monitor 115 may track each task performed by a user and may attempt to determine whether the task was completed successfully. Depending on the implementation, the task monitor 115 may automatically infer whether or not a task was completed successfully based on factors such as whether or not a follow-up communication was received, behavior of the user (e.g., did the user visit the contact after requesting an interview, or did the user ask the same question to another contact), or based on an textual analysis of a follow-up communication (e.g., does the follow-up email include an answer to the question, or does the tone of the follow-up communication indicate that the contact accepted an offer).

Alternatively or additionally, the task monitor 115 may periodically ask the user via the client device 110 whether or not a task was successfully completed using a user-interface element. The user may then indicate whether or not the task was completed successfully or unsuccessfully using the user-interface element. For example, after a response is received from a contact answering a question, the task monitor 115 may generate a user-interface elements that asks the user to rate their satisfaction with the answer. Alternatively, the task monitor 115 may follow up with a user after some amount of time has passed since a task was initiated to determine if the task had been completed (e.g., after a day, a week, or a month).

Other information may be associated with the task data 130 such as an indication of how long a particular task took to complete. In addition, the task data 130 may include an indication of the quality of a completed task. For example, when a task is completed, the task monitor 115 may ask the user to rate the quality of the task on a scale of 1 to 5. Other quality indicators may be supported.

The task engine 220 may use the generated task data 130 to generate one or more task models 225. A task model 225 may take as an input an identifier of a particular node of the graph, an identifier of a task, and an identifier of a communication type, and may output a score that is based on the task data 130 associated with the contact represented by the identified node, the identified task, and the identified communication type. The score may represent how likely the identified contact will complete the identified task using the identified communication type.

Depending on the implementation, the task engine 220 may generate multiple task models 225, with each task model generating a score based on a different criteria. For example, the scores generated by different task models 225 may represent criteria such as likelihood of task completion, speed of task completion, and quality of task completion. Other criteria may be used.

The task models 225 may be generated by the task engine 220 from the task data 130 using machine learning. The generated task models 225 may be continuously adjusted by the task engine 220 as new task data 130 or other feedback regarding task completion is received by the task engine 220. Any method for machine learning may be used.

The path engine 230 may identify one or more paths 140 in the graph that are responsive to a received query 120. As described above, a query 120 may include one or more terms. The terms of a received query may include names of one or more contacts, organizations, businesses, interests, and any other information that may be associated with a user profile from the social networking applications 170 or the productivity applications 117. Example queries 120 may be for contacts named "Bob Jones", contacts who attended Stanford University, contacts who have children, contacts who are between the ages of 23 and 34, etc.

A received query 120 may also include an identifier of a task. Example tasks that may be included in a query 120 include "applying for a job", "asking a question", and "arranging a tour." Other tasks may be supported. Depending on the implementation, a user may provide a query 120 by typing one or more terms into a user-interface element such as a form. The path engine 230 may then infer the indicated task from the terms of the query 120, or the user may select the task from a list of tasks presented to the user by the path engine 230.

The path engine 230 may identity one or more paths 140 that are responsive to a received query by searching for nodes of the graph that match one or more terms of the query 120. For example, the path engine 230 may search for nodes with profiles that include text that matches or partially matches some or all of the terms of the query 120. The nodes that best match the terms of the query 120 may then be selected by the path engine 230.

Depending on the implementation, when selecting the nodes the path engine 230 may consider the privacy data 245 associated with any selected nodes. For example, the privacy data 245 associated with a node may indicate that the user associated with the node does not want to be discovered by users of a particular social networking application 170. If a query 120 originates from a user of that social networking application 170, then the path engine 230 may remove the node from consideration.

After selecting one or more nodes in response to a query 120, the path engine 230 may determine some or all of the paths 140 through the graph between the selected one or more nodes and the node of the user that originated the query 120. As described above, the users represented by the nodes in the graph may be connected by a variety of edges that each represents a different communication type associated with either a social networking application 170 or a productivity application 117. Accordingly, for any two nodes in the graph there may be numerous paths 140 through the graph that connect the nodes, with each path 140 consisting of different edges or different sequences of nodes. Any method for determining paths 140 in a graph may be used.

In some implementations, when determining paths 140 the path engine 230 may also consider one or more rules 235. The rules 235 may be defined by a user or administrator and may specify limits on the types of edges and nodes that may be included in a determined path 140, as well as the limit the length of the path 140. For example, with respect to edges, the path engine 230 may not consider edges that are associated with communication types that have been unused by the users associated with the nodes connected by the edges for more than a threshold amount of time (e.g., 1 year, 2 years, etc.). With respect to nodes, the path engine 230 may not consider nodes associated with users who only recently became associated with the social networking applications 170 and/or productivity applications 117. With respect to path length (i.e., the number of edges in a path 140), the maximum path length may be four. Other lengths may be specified.

The path ranker 240 may rank the paths 140 determined by the path engine 230 using the task model 225 and the task associated with the query 120. Depending on the implementation, the path ranker 240 may determine a score for the final node and edge of each path 140 using a task model 225. The particular task model 225 used to rank the paths 140 may be selected based on criteria associated with the query 120 or set by a user or administrator. Examples of criteria include likelihood of response, quality of response, and timeliness of response.

The path ranker 240 may provide the ranked paths 140 to the client device 110 associated with the query 120. Alternatively or additionally, the path ranker 240 may provide only the highest ranked path 140 to the user. The last edge in a path 140 may represent the most successful communication type to use to communicate with the contact represented by the last node in the path 140. Accordingly, the path ranker 240 may also indicate the most successful communication type to the user associated with the query 120.

Figure 3:
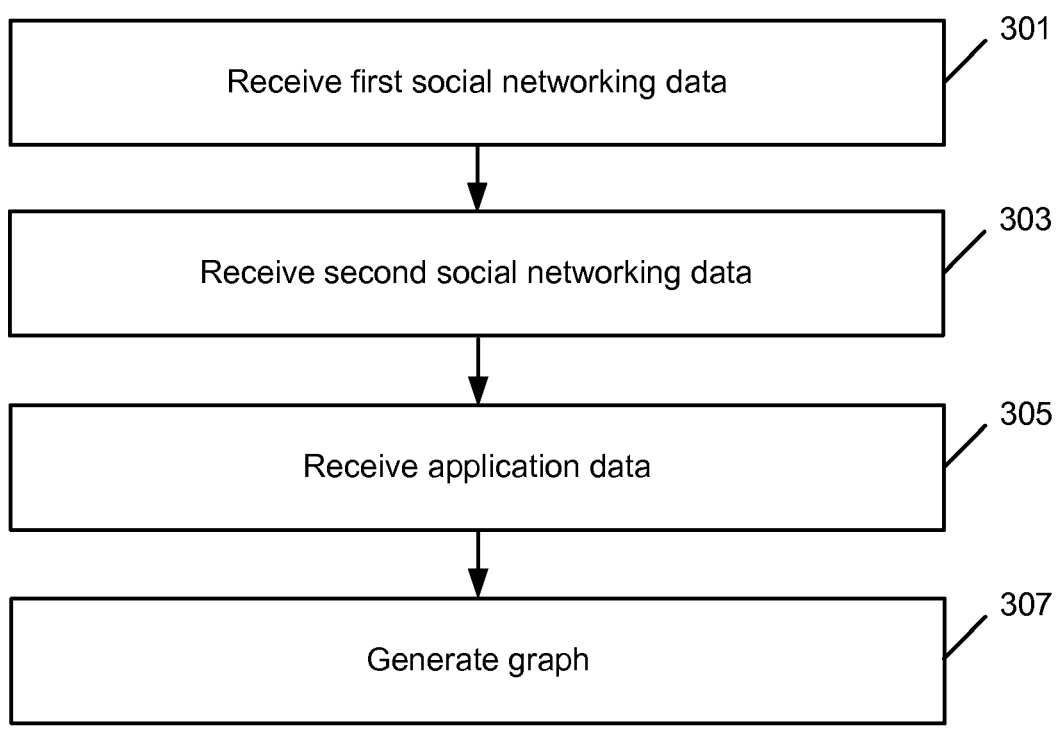
FIG. 3 is an operational flow of an implementation of a method for generating a graph from social networking data and application data.

FIG. 3 is an operational flow of an implementation of a method 300 for generating a graph from social networking data and application data. The method 300 may be implemented by the graph engine 160.

At 301, first social networking data is received. The first social networking data 175 may be received by the graph generator 210 of the graph engine 160 from an associated first social networking application 170. The first social networking data 175 may be associated with a user of the associated first social networking application 170.

In some implementation, the first social networking data 175 may include a plurality of contacts. The contacts may have a social networking relationship with the user in the first social networking application 170. For example, the contacts may be "friends" of the user in the first social networking application 170. The first social networking data 175 may also include profiles associated with each of the contacts.

At 303, second social networking data is received. The second social networking data 175 may be received by the graph generator 210 of the graph engine 160 from an associated second social networking application 170. Similar to the first social networking data 175, the second social networking data 175 may be associated with the user, and may include contacts of the user in the second social networking application 170. The first and second social networking data 175 may include at least one contact in common.

At 305, application data is received. The application data 119 may be received from a productivity application 117. The productivity application 117 may include word processing applications, email applications, instant messaging applications, and phone applications. Other types of applications may be supported. Like the social networking data 175, the application data 119 may include a plurality of contacts associated with the user of the productivity application 117.

Each of the first social networking data 175, second social networking data 175, and application data 119 may be associated with a communication type of a plurality of communication types. With respect to the first social networking data 175 and second social networking data 175, the associated communication type may the messaging system used by the associated social networking application 170. For example, the first social networking application 170 may provide a messaging application that allows users of the social network to communicate to each other.

With respect to the application data 119, the associated communication type 117 may depend on what type of productivity application 117 that is associated with the application data 119. Where the application 117 is an email application, the communication type may be email. Where the application 117 is a phone application, the communication type may be telephone. Other communication types may be supported.

At 307, a graph is generated. The graph may be generated by the graph generator 210 of the graph engine 160. The graph may be generated from the first social networking data 175, the second social networking data 175, and the application data 119. The graph may include a plurality of nodes and a plurality of edges. Each node may represent one of a contact from the first social networking application 170, a contact from the second social networking application 170, and a contact from the productivity application 117. The graph may also include a node for the user. The generated graph may be stored by the graph generator 210 as the graph data 165.

Each edge in the graph may further connect two nodes of the plurality of nodes, and may represent one of the communication types associated with either the first social networking application 170, the second social networking application 170, or the productivity application 117. An edge between two nodes may indicate that the contacts associated with the nodes may communicate using the communication type associated with the edge.

Depending on the implementation, the graph generator 210 may generate the graph by generating a node for each contact in the first social networking application 170, the second social networking application 170, and the productivity application 117. Each generated node may include some or all of the profile information associated with the contact. Nodes that are found to represent the same contact may be merged together, including the associated profile information. The social networking relationships, or other relationships associated with the contacts in the first social networking data 175, second social networking data 175, and the application data 119 may be used to generate the edges between the nodes.

Figure 4:
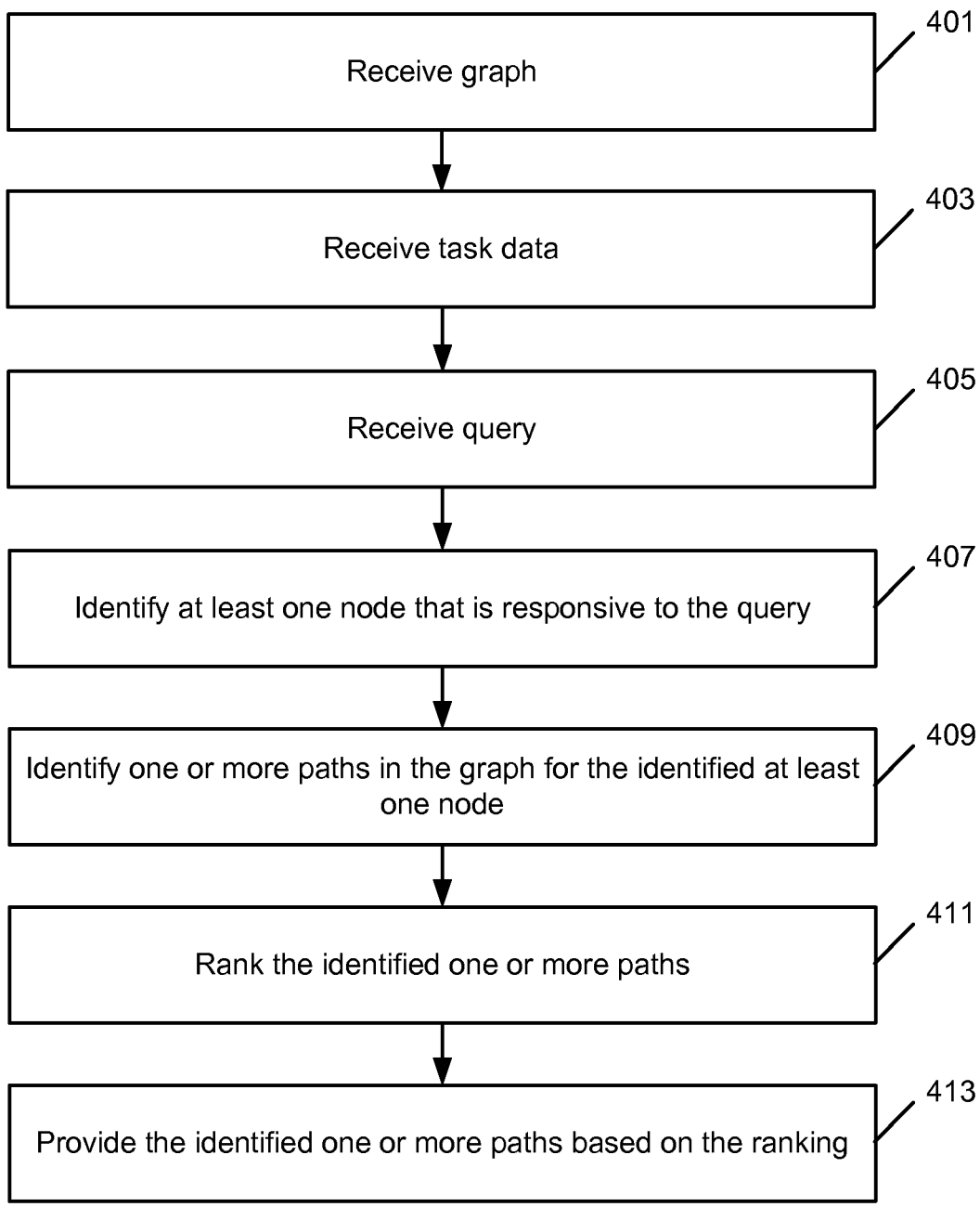
FIG. 4 is an operational flow of an implementation of a method for providing one or more paths in response to a query.

FIG. 4 is an operational flow of an implementation of a method 400 for providing one or more paths in response to a query. The method 400 may be implemented by the graph engine 160.

At 401, a graph is received. The graph may be received from the graph generator 210 of the graph engine 160. The graph may be the graph generated at 307 and may represent the various contacts of a user from multiple social networking applications 170 and productivity applications 117. Each node in the graph may represent a contact, and each edge in the graph may represent a type of communication used to communicate between the nodes connected by the edge.

At 403, task data is received. The task data 130 may be received by the task engine 220. The task data 130 may have been collected by a task monitor 115. The task data 130 may identify a plurality of tasks that were attempted by contacts identified in the received graph. Each task may identify the contact that was contacted to perform the task, the communication type used for the task, and an indication of whether or not the task was completed. Other information may be included in the task data 130. The task data 130 may be used to generate one or more task models 225.

At 405, a query is received. The query 120 may be received by the graph engine 160. The query 120 may include one or more terms. The query 120 may also be associated with a task of the plurality of tasks.

At 407, at least one node that is responsive to the query is identified. The at least one node that is responsive to the query 120 may be determined by the path engine 230 by matching the terms of the query 120 against the profile information associated with the contacts represented by each node in the graph.

At 409, one or more paths are identified in the graph for the identified at least one node. The one or more paths may be identified by the path engine 230. A path 140 may be a sequence of nodes and edges in the graph that connect the node representing the user in the graph with the identified at least one node. Any method for identifying paths 140 in a graph may be used. In some implementations, the path engine 230 may also consider rules 235 and privacy data 245 associated with the user and the identified at least one node when identifying the one or more paths 140.

At 411, the identified one or more paths are ranked. The identified one or more paths may be ranked by the path ranker 240 using one more task models 225. The task models 225 may rank the paths based on the task data 130 associated with the contacts represented by the nodes in each of the identified one or more paths 140. In some implementations, the paths may be ranked based on length. For example, identified paths having a lower number of edges may be ranked higher than paths having a higher number of edges. In addition, the task data 130 may be used to determine a weight for the edges of the identified paths and the determined weights may be used to rank the paths, in combination with, or separately from, the path lengths. A weight for an edge may be determined from the task data 130, and may reflect how likely a task is to be completed using the communication type represented by the edge with respect to the contacts represented by the nodes connected by the edge. Any method or algorithm for ranking paths in graphs may be used.

At 413, the identified one or more paths are provided based on the ranking. The identified one or more paths 140 may be provided to the user that provided the query 120 by the graph engine 160. The last edge in each path 140 may represent the optimal communication type to use to communicate with the contact represented by the last node in the path.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system comprises at least one computing device adapted to generate a query for a user, and a graph engine. The graph engine is adapted to receive first social networking data from a first social network, wherein the first social networking data comprises a first plurality of contacts associated with the user and a first communication type of a plurality of communication types, receive second social networking data from a second social network, wherein the second social networking data comprises a second plurality of contacts associated with the user and a second communication type of the plurality of communication types, and receive application data from a productivity application, wherein the application data comprises a third plurality of contacts associated with the user and a third communication type of the plurality of communication types. The graph engine is further adapted to generate a graph from the first social networking data, the second social networking data, and the application data, wherein the graph comprises a plurality of nodes and each node represents one of a contact of the first plurality of contacts, a contact from the second plurality of contacts, a contact from the third plurality of contacts, or the user, and wherein the graph further comprises a plurality of edges, each edge connects two nodes of the plurality of nodes, and each edge represents one of the first communication type, the second communication type, or the third communication type. The graph engine is further adapted to receive the query from the user, identify at least one node of the graph that is responsive to the query, identify one or more paths in the graph that connect the identified at least one node and the node representing the user, wherein each of the identified one or more paths comprises a sequence of nodes and edges from the graph, and provide the identified one or more paths to the at least one computing device in response to the query.

Implementations may include some or all of the following features. The query may identify a task. The graph engine may be further adapted to receive task data associated with the user from the at least one computing device, wherein the task data identifies a plurality of tasks, each identified task is associated with a contact from the first plurality of contacts, the second plurality of contacts, or the third plurality of contacts, each identified task is associated with an indication of whether or not the identified task was successful, and each identified task is associated with one of the first communication type, the second communication type, or the third communication type. The graph engine may be further adapted to rank each of the identified one or more paths based on the contacts represented by the nodes in each path, the contacts associated with the tasks of the plurality of tasks, the first communication type, the second communication type, or the third communication type associated with the edges in each path, and the indication associated with each task of the plurality of tasks, and provide the identified one or more paths according to the ranking. The task identified by the query may include one or more of a networking task, an employment task, a social task, or an education task. The at least one computing device may include a monitoring application, and the task data may be received from the monitoring application. The productivity application may include one or more of a word processing application, an email application, a smart phone application, an instant messaging application, and a VoIP application. The graph engine may be further adapted to receive privacy information associated with the first social network and the second social network for the user, and identify the at least one node of the graph that is responsive to the query based on the graph and the privacy information. The query may further include one or more terms and each node of the graph may be associated with a profile from either the first social network or the second social network. The graph engine may be further adapted to identify at least one node of the graph with an associated profile that matches some or all of the one or more terms of the query.

In an implementation, first social networking data is received from a first social network by a computing device, wherein the first social networking data comprises a first plurality of contacts associated with a user and a first communication type of a plurality of communication types. Second social networking data is received from a second social network by the computing device, wherein the second social networking data comprises a second plurality of contacts associated with the user and a second communication type of the plurality of communication types. A graph is generated from the first social networking data and the second social networking data by the computing device. The graph comprises a plurality of nodes and each node represents one of a contact of the first plurality of contacts, a contact from the second plurality of contacts, or the user. The graph further comprises a plurality of edges, each edge connects two nodes of the plurality of nodes, and each edge represents either the first communication type or the second communication type. A query is received from the user by the computing device. At least one node of the graph that is responsive to the query is identified by the computing device. One or more paths in the graph that connect the identified at least one node and the node representing the user are identified by the computing device, wherein each of the identified one or more paths comprises a sequence of nodes and edges from the graph. The identified one or more paths are provided in response to the query by the computing device.

Implementations may include some or all of the following features. The query may identify a task. Task data associated with the user may be received, wherein the task data identifies a plurality of tasks, each identified task is associated with a contact from either the first or the second plurality of contacts, each identified task is associated with an indication of whether or not the identified task was successful, and each identified task is associated with either the first or the second communication types. Each of the identified one or more paths may be ranked based on the contacts represented by the nodes in each path, the contacts associated with the tasks of the plurality of tasks, the first type of communication or second type of communication associated with the edges in each path, and the indication associated with each task of the plurality of tasks. The identified one or more paths may be provided according to the ranking. The task identified by the query may comprise one or more of a networking task, an employment task, a social task, or an education task. Application data may be received from a productivity application, wherein the application data comprises a third plurality of contacts associated with the user and a third communication type of the plurality of communication types. The graph may be generated from the first social networking data, the second social networking data, and the application data. The productivity application may comprise one or more of a word processing application, an email application, a smart phone application, an instant messaging application, and a VoIP application. The first and second plurality of contacts include at least one contact in common. Privacy information associated with the first social network and the second social network may be received for the user, and the at least one node of the graph that is responsive to the query may be identified based on the graph and the privacy information. The query may further include one or more terms and each node of the graph may be associated with a profile from either the first social network or the second social network. Identifying at least one node of the graph that is responsive to the query may comprise identifying at least one node of the graph with an associated profile that matches some or all of the one or more terms of the query.

In an implementation, a graph of a first social network and a second social network for a user is received by a computing device. The first social network is associated with a first communication type of a plurality of communication types and the second social network is associated with a second communication type of the plurality of communication types. The graph comprises a plurality of nodes and each node represents one of a contact of a first plurality of contacts of the first social network, a contact of a second plurality of contacts of the second social network, or the user, and wherein the graph further comprises a plurality of edges, each connects two nodes of the plurality of nodes, and each edge represents either the first communication type or the second communication type. Activity of the user is monitored on the computing device to generate task data, wherein the task data identifies a plurality of tasks, each identified task is associated with a contact from either the first or the second plurality of contacts, each identified task is associated with an indication of whether or not the task was successful, and each identified task is associated with either the first or the second communication types. A query is received from the user by the computing device, wherein the query identifies a task. At least one node of the graph that is responsive to the query is identified by the computing device. One or more paths in the graph that connect the identified at least one node and the node representing the user are identified by the computing device. Each of the identified one or more paths comprises a sequence of nodes and edges from the graph. Each of the identified one or more paths are ranked based on the contacts represented by the nodes in each path, the contacts associated with the tasks of the plurality of tasks, the first type of communication or second type of communication associated with the edges in each path, and the indication associated with each task of the plurality of tasks. The identified one or more paths are provided according to the ranking in response to the query by the computing device.

Implementations may include some or all of the following features. The task identified by the query may comprise one or more of a networking task, an employment task, a social task, or an education task. The first and second plurality of contacts may include at least one contact in common. The query may further comprise one or more terms and each node of the graph may be associated with a profile from either the first social network or the second social network. Identifying at least one node of the graph that is responsive to the query may include identifying at least one node of the graph with an associated profile that matches some or all of the one or more terms of the query.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for combining data from multiple social networking applications and productivity applications and for responding to queries using the combined data comprising:
   at least one computing device adapted to generate a query for a user; and
   a graph engine adapted to:
      receive first social networking data from a first social networking application, wherein the first social networking data comprises a first plurality of contacts associated with the user and a first communication type of a plurality of communication types;
      receive second social networking data from a second social networking application, wherein the second social networking data comprises a second plurality of contacts associated with the user and a second communication type of the plurality of communication types;
      receive application data from a productivity application, wherein the application data comprises a third plurality of contacts associated with the user and a third communication type of the plurality of communication types;
      generate a graph from the first social networking data, the second social networking data, and the application data, wherein the graph comprises a plurality of nodes and each node represents one of a contact of the first plurality of contacts, a contact from the second plurality of contacts, a contact from the third plurality of contacts, or the user, and wherein the graph further comprises a plurality of edges, each edge connects two nodes of the plurality of nodes, and each edge represents one of the first communication type, the second communication type, or the third communication type;
      receive the query from the user;
      identify at least one node of the graph that is responsive to the query;
      identify one or more paths in the graph that connect the identified at least one node and a node representing the user, wherein each of the identified one or more paths comprises a sequence of nodes and edges from the graph; and
      provide the identified one or more paths to the at least one computing device in response to the query.

2. The system of claim 1, wherein the query identifies a task, and wherein the graph engine is further adapted to:
   receive task data associated with the user from the at least one computing device, wherein the task data identifies a plurality of tasks, each identified task is associated with a contact from the first plurality of contacts, the second plurality of contacts, or the third plurality of contacts, each identified task is associated with an indication of whether or not the identified task was successful, and each identified task is associated with one of the first communication type, the second communication type, or the third communication type;
   rank each of the identified one or more paths based on the contacts represented by the nodes of the sequence of nodes comprising each path, the contacts associated with the tasks of the plurality of tasks, the first communication type, the second communication type, or the third communication type associated with the edges in each path, and the indication associated with each task of the plurality of tasks; and provide the identified one or more paths according to the ranking.

3. The system of claim 2, wherein the task identified by the query comprises one or more of a networking task, an employment task, a social task, or an education task.

4. The system of claim 2, wherein the at least one computing device includes a monitoring application, and wherein the task data is received from the monitoring application.

5. The system of claim 1, wherein the productivity application comprises one or more of a word processing application, an email application, a smart phone application, an instant messaging application, and a VoIP application.

6. The system of claim 1, wherein the graph engine is further adapted to receive privacy information associated with the first social networking application and the second social networking application for the user, and identify the at least one node of the graph that is responsive to the query based on the graph and the privacy information.

7. The system of claim 1, wherein the query further comprises one or more terms and each node of the graph is associated with a profile from either the first social networking application or the second social networking application, and wherein the graph engine adapted to identify at least one node of the graph that is responsive to the query comprises the graph engine adapted to identify at least one node of the graph with an associated profile that matches some or all of the one or more terms of the query.

8. A method for combining data from multiple social networking applications and productivity applications and for responding to queries using the combined data comprising:
receiving first social networking data from a first social networking application by a computing device, wherein the first social networking data comprises a first plurality of contacts associated with a user and a first communication type of a plurality of communication types;
receiving second social networking data from a second social networking application by the computing device, wherein the second social networking data comprises a second plurality of contacts associated with the user and a second communication type of the plurality of communication types;
generating a graph from the first social networking data and the second social networking data by the computing device, wherein the graph comprises a plurality of nodes and each node represents one of a contact of the first plurality of contacts, a contact from the second plurality of contacts, or the user, and wherein the graph further comprises a plurality of edges, each edge connects two nodes of the plurality of nodes, and each edge represents either the first communication type or the second communication type;
receiving a query from the user by the computing device;
identifying at least one node of the graph that is responsive to the query by the computing device;
identifying one or more paths in the graph that connect the identified at least one node and a node representing the user by the computing device, wherein each identified one or more path comprises a sequence of nodes and edges from the graph; and
providing the identified one or more paths in response to the query by the computing device.

9. The method of claim 8, wherein the query identifies a task and further comprising:

receiving task data associated with the user, wherein the task data identifies a plurality of tasks, each identified task is associated with a contact from either the first or the second plurality of contacts, each identified task is associated with an indication of whether or not the identified task was successful, and each identified task is associated with either the first or the second communication types;
ranking each of the identified one or more paths based on the contacts represented by the nodes of the sequence of nodes comprising each path, the contacts associated with the tasks of the plurality of tasks, the first type of communication or second type of communication associated with the edges in each path, and the indication associated with each task of the plurality of tasks; and
providing the identified one or more paths according to the ranking.

10. The method of claim 9, wherein the task identified by the query comprises one or more of a networking task, an employment task, a social task, or an education task.

11. The method of claim 8, further comprising receiving application data from a productivity application, wherein the application data comprises a third plurality of contacts associated with the user and a third communication type of the plurality of communication types.

12. The method of claim 11, further comprising generating the graph from the first social networking data, the second social networking data, and the application data.

13. The method of claim 11, wherein the productivity application comprises one or more of a word processing application, an email application, a smart phone application, an instant messaging application, and a VoIP application.

14. The method of claim 8, wherein the first plurality of contacts and the second plurality of contacts include at least one contact in common.

15. The method of claim 8, further comprising receiving privacy information associated with the first social networking application and the second social networking application for the user, and identifying the at least one node of the graph that is responsive to the query based on the graph and the privacy information.

16. The method of claim 8, wherein the query further comprises one or more terms and each node of the graph is associated with a profile from either the first social networking application or the second social networking application, and
wherein identifying at least one node of the graph that is responsive to the query comprises identifying at least one node of the graph with an associated profile that matches some or all of the one or more terms of the query.

17. A method for combining data from multiple social networking application and productivity applications and for responding to queries using the combined data comprising:
receiving a graph of a first social networking application and a second social networking application for a user by a computing device, wherein the first social networking application is associated with a first communication type of a plurality of communication types and the second social networking application is associated with a second communication type of the plurality of communication types, wherein the graph comprises a plurality of nodes and each node represents one of a contact of a first plurality of contacts of the first social networking application, a contact of a second plurality of contacts of the second social networking application, or the user, and wherein the graph further comprises a plurality of edges, each edge connects two nodes of the plurality of nodes, and each edge represents either the first communication type or the second communication type;

monitoring activity of the user on the computing device to generate task data, wherein the task data identifies a plurality of tasks, each identified task is associated with a contact from either the first or the second plurality of contacts, each identified task is associated with an indication of whether or not the task was successful, and each identified task is associated with either the first or the second communication types;

receiving a query from the user by the computing device, wherein the query identifies a task;

identifying at least one node of the graph that is responsive to the query by the computing device;

identifying one or more paths in the graph that connect the identified at least one node and a node representing the user by the computing device, wherein each of the identified one or more paths comprises a sequence of nodes and edges from the graph;

ranking each of the identified one or more paths based on the contacts represented by the nodes of the sequence of nodes comprising each path, the contacts associated with the tasks of the plurality of tasks, the first type of communication or second type of communication associated with the edges in each path, and the indication associated with each task of the plurality of tasks; and providing the identified one or more paths according to the ranking in response to the query by the computing device.

18. The method of claim 17, wherein the task identified by the query comprises one or more of a networking task, an employment task, a social task, or an education task.

19. The method of claim 17, wherein the first plurality of contacts and the second plurality of contacts include at least one contact in common.

20. The method of claim 17, wherein the query further comprises one or more terms and each node of the graph is associated with a profile from either the first social networking application or the second social networking application, and wherein identifying at least one node of the graph that is responsive to the query comprises identifying at least one node of the graph with an associated profile that matches some or all of the one or more terms of the query.

* * * * *